(12) United States Patent
Ruffa

(10) Patent No.: US 7,365,650 B1
(45) Date of Patent: Apr. 29, 2008

(54) UNDERWATER RF PROPAGATION PATH

(75) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 178 days.

(21) Appl. No.: 11/326,671

(22) Filed: Dec. 19, 2005

(51) Int. Cl.
*H04B 14/00* (2006.01)
(52) U.S. Cl. .................. 340/850; 367/131; 114/328
(58) Field of Classification Search ................ 367/131, 367/117; 114/328, 244, 312, 313, 318, 322, 114/264, 267; 340/850
See application file for complete search history.

(56) References Cited

U.S. PATENT DOCUMENTS

| | | | |
|---|---|---|---|
| 5,982,297 A | 11/1999 | Welle | |
| 6,058,874 A * | 5/2000 | Glenning et al. | ........... 114/328 |
| 6,127,942 A | 10/2000 | Welle | |
| 6,368,275 B1 | 4/2002 | Sliwa et al. | |
| 6,512,478 B1 | 1/2003 | Chien | |

* cited by examiner

*Primary Examiner*—Brian Zimmerman
*Assistant Examiner*—Hung Q Dang
(74) *Attorney, Agent, or Firm*—James M. Kasischke; Jean-Paul A. Nasser; Michael P. Stanley

(57) ABSTRACT

An underwater RF signal propagation path is created by utilizing a plurality of individual RF transceivers such as MEMS RF transceivers. Each MEMS RF transceiver has a predetermined buoyancy. A stream of the RF transceivers are released to form a line of RF transceivers underwater such that the individual RF transceivers have an RF transmission and reception distance greater than the distance between the RF transceivers whereby an RF signal can be repeatedly retransmitted down the line of RF transceivers.

17 Claims, 3 Drawing Sheets

UNDERWATER RF PROPAGATION PATH

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to radio frequency transmissions from underwater vehicles and, more particularly, an RF transmission signal path created using a plurality of spaced components.

(2) Description of the Prior Art

Deployment of a cable for use in transmitting and/or receiving radio waves from underwater vehicles is known. There are many problems related to use of such cables. However because radio frequency transmissions quickly attenuate in water, specialized cables have been designed for such signals. However, such cables require increased diameters and handling systems that are not practical for many applications.

The following U.S. patents describe various prior art systems that may be related to the above and/or other telemetry systems:

U.S. Pat. No. 5,982,297, issued Nov. 9, 1999, to Welle, discloses a system that includes a first transducer and a second transducer coupled together through a coupling medium communicating input and output undulating pressure waves between the first and second transducers for the transfer of input and output data between an external controller and an embedded sensory and actuating unit. The controller providing input data signals energizing the first transducer and the embedded unit providing output data signals energizing the second transducer collectively for bidirectional communication of data between the controller and embedded unit for functional sensor and actuator process control. The primary advantage of the system is the bidirectional transfer of data through a coupling medium without the use of electrical power wires for controlling embedded sensors and actuators.

U.S. Pat. No. 6,127,942, issued Oct. 3, 2000, to Welle, discloses a system that includes a first transducer and a second transducer coupled together through a coupling medium communicating undulating pressure wave from the first transducer to the second transducer for the transfer of electrical power from an external controller energizing the first transducer transducing the power signal into an undulating pressure wave communicated through the medium to the second transducer traducing the undulating pressure wave into an electrical response signal that can be converted into useful power for powering an embedded sensory and actuation control unit. The primary advantage of the system is the transfer of power through a coupling medium without the use of electrical power wires.

U.S. Pat. No. 6,368,275, issued Apr. 9, 2002, to Sliwa et al, discloses a micro-instrument suitable for property imaging in a body that is less than one millimeter in each dimension. The micro-instrument includes a base having a first wall and a second wall, the second wall substantially circumscribing the first wall, and a lid connected with the base to form a cavity and the lid being temporarily deformable. Optionally, the lid can include a cantilever that is deformable. Also optionally, an electronic circuit can be attached with the micro-instrument. The micro-instrument can also be substantially spherical. An observable property of the micro-instrument varies as a function of a physiological property of the body.

U.S. Pat. No. 6,512,478, issued Jan. 28, 2003, to Chien, discloses an extensible short-range tracking system. The tracking system disclosed is a multi-level tracking system. At the first level is an RF tag, which is a transmit-only unit that transmits information including minimally an identification number. The transmission from the RF tags are sporadic with timing depending upon the application at implementation. Generally, the transmission timing comprises a transmission, which is repeated periodically at random times. Transmissions from the RF tags are received in a series of relays. The relays may calculate the position of the tags by knowing the position of the relays and the time difference of arrival of the signals from the RF tags by several relays or may pass the information needed to calculate position to a base station. Alternately, the RF tags may generate position information and transmit that information along with the RF tag identifier to the relays. The relays, which may be networked among themselves, then relay the information from the tags to a base station unit. The base station unit may be part of various applications such as a fire control system in a military application or an inventory system in an industrial application.

The above cited prior art does not disclose a system for transmitting radio frequency signals through water and perhaps through water to air. The solutions to the above described and/or related problems have been long sought without success. Consequently, those skilled in the art will appreciate the present invention that addresses the above and other problems.

SUMMARY OF THE INVENTION

It is a general purpose of the present invention to provide an underwater RF signal propagation path.

A feature of one embodiment of the invention is a plurality of individual RF transceivers operable for transmitting and receiving RF signals a short distance underwater.

Another advantage is that an underwater RF transmission path can be created without the use of a conductive cable so as to avoid the problems associated therewith.

These and other objects, features, and advantages of the present invention will become apparent from the drawings, the descriptions given herein, and the appended claims. However, it will be understood that above listed objects and advantages of the invention are intended only as an aid in understanding certain aspects of the invention, are not intended to limit the invention in any way, and do not form a comprehensive or exclusive or a necessarily required list of objects, features, and advantages.

Accordingly, the present invention comprises a method for creating an underwater RF signal propagation path. The method may comprise one or more steps such as, for instance, releasing a stream of individual RF transceivers from an underwater vehicle at a rate to effect a spacing between the individual RF transceivers that is less than the distance for which the underwater RF signal would be attenuated to below noise levels. Other steps may comprise propagating an RF signal underwater by transmitting the RF signal to a first of the RF transceivers which in turn retransmits the RF signal so that the RF signal is transmitted along the stream of individual RF transceivers. The method may further comprise providing that the individual RF transceivers have a predetermined buoyancy. In one embodiment, the predetermined buoyancy may be selected so that at least a portion of the individual transceivers reach a water surface to effect an RF signal propagation path from the underwater vehicle to air.

In another embodiment, the predetermined buoyancy is selected to be neutral or approximately neutral.

The method may further comprise utilizing the stream of individual RF transceivers to provide an RF signal propagation path between the underwater vehicle and another underwater vehicle. The method may further comprise utilizing MEMS RF chips as the individual RF transceivers. The method may further comprise discarding the stream of individual RF transceivers after use.

The present invention may also comprise a system for creating an underwater RF signal propagation path. For instance, the system may comprise a plurality of individual RF transceivers releasable into water wherein the plurality of individual RF transceivers have a predetermined buoyancy. The plurality of individual RF transceivers have an RF transmission/reception range and are operable for transmitting and receiving with respect to each other whereby when the plurality of individual RF transceivers are released into water the underwater RF signal propagation path is formed. The system may further comprise at least one underwater vehicle operable for releasing a stream of the individual RF transceivers at a controlled rate of release. The system may further comprise a first and second underwater vehicle whereby the underwater RF signal propagation path is created therebetween.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

MEMS (microelectromechanical systems) applications presently include a single-chip RF MEMS transceiver that is envisioned to be used for watch-sized cell phones. Such devices may be made quite small, e.g., less than one square centimeter in size. Commercial use of these devices will eventually drive prices down so that large numbers of them can be expended relatively cheaply. In one possible embodiment, the present invention provides a novel use of a trail of such devices, relatively closely spaced, to support an underwater RF propagation path. MEMS RF transceivers are one way to accomplish the objective; however, non-MEMS transceivers can work as well, as reflected in the claims and discussion below.

Figure 1:
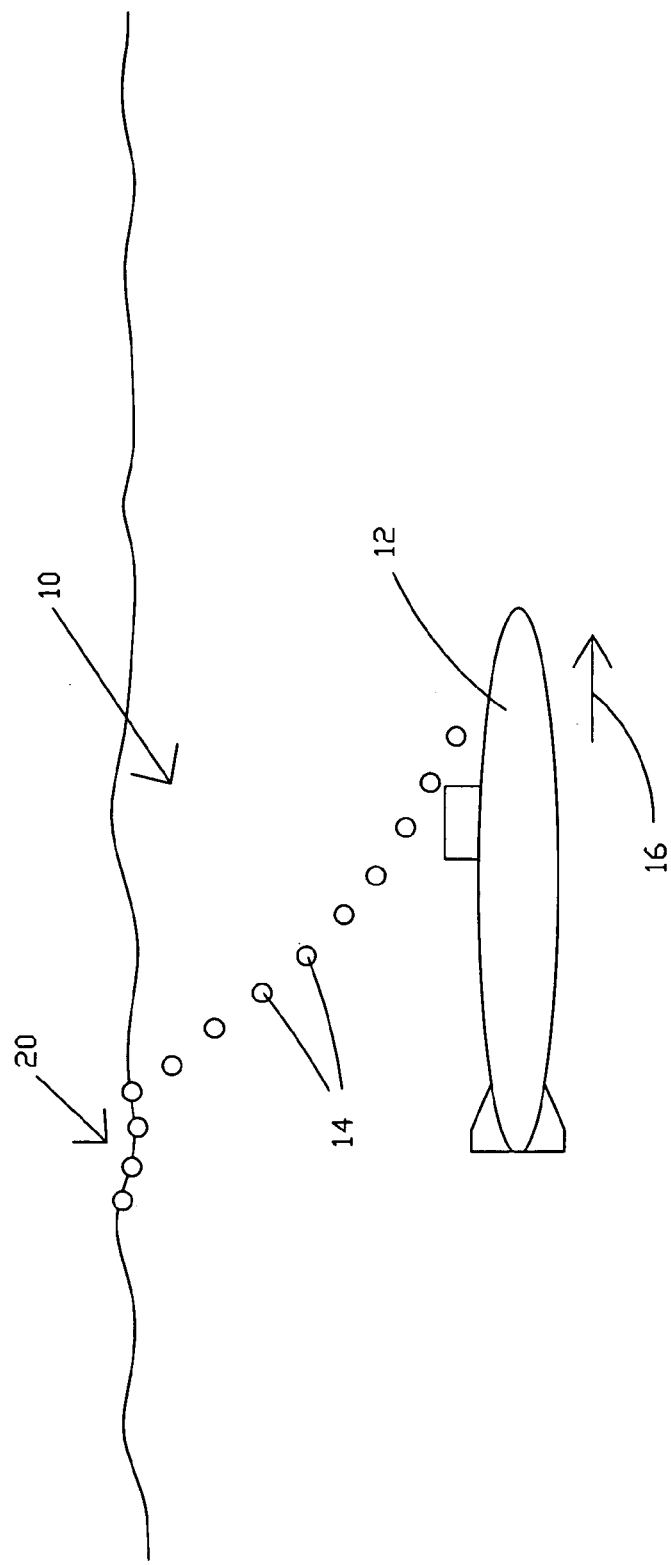
FIG. 1 is a schematic view of one possible embodiment of the present invention which may be utilized for establishing a radio frequency signal path through water to air.

Referring now to the drawings and, more particularly, to FIG. 1 there is shown underwater RF transmission system 10 wherein an underwater to surface RF transmission system is provided without the use of cables. In this example, an underwater vehicle 12, such as a submarine, deploys a continuous stream of MEMS RF chips or other RF transceivers 14. As used herein, it will be understood that while MEMS RF chips 14 are utilized in one present embodiment, other types of transceivers, may also be utilized in accord with the present invention. MEMS RF chips or RF transceivers 14 also happen to be positively buoyant due to attached syntactic foam, air bubbles, or any other suitable floatation means. In one embodiment, MEMS RF chips 14 are deployed at a rate with respect to velocity 16 of the underwater vehicle 12 so that as they rise, the separation of any two adjacent chips is predetermined and/or less than desired separation distance or spacing 18. Changing the frequency could increase the allowable separation distance, if needed. Each MEMS RF chip 14 simply receives the RF signal, amplifies it, and retransmits it to its neighbor. Thus, MEMS RF chips 14 that have floated to the surface as indicated at 20 can receive and/or transmit the RF field in the air. Each MEMS RF chip 14 can receive/transmit the RF signal to the next adjacent underwater MEMS RF chip. Each chip would thus transmit the signal to the nearby adjacent chip, thus establishing a propagation path from the surface to the ship.

Figure 2:
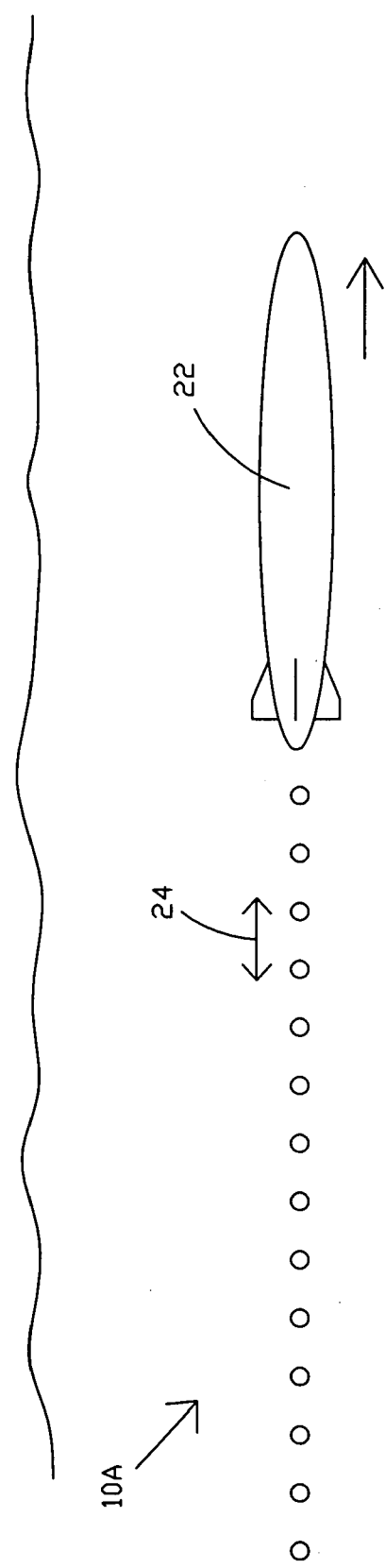
FIG. 2 is a schematic view of one possible embodiment of the present invention which may be utilized for establishing a radio frequency link between two underwater vehicles.

In another embodiment as shown in FIG. 2, underwater RF transmission system 10A is utilized to create an RF signal path from a ship or submarine to a deployed unmanned underwater vehicle (UUV) 22, such as a torpedo. Unmanned underwater vehicle 22 would continuously release MEMS RF chips 14 at a rate so that their separation 24 would allow communication between adjacent MEMS RF chips 14. This would establish a two-way RF signal propagation path between the torpedo and the ship without the need for a wire or cable. Again, the frequency could be lowered to maximize the allowable separation distance between adjacent chips. In this case, the chips may preferably be neutrally buoyant. If the ship or submarine is also moving, then the ship or submarine could also be releasing additional chips in order to maintain the RF signal path.

In one possible preferred embodiment of both of these examples, the life of each chip could be on the order of a few minutes, minimizing power requirements.

Figure 3:
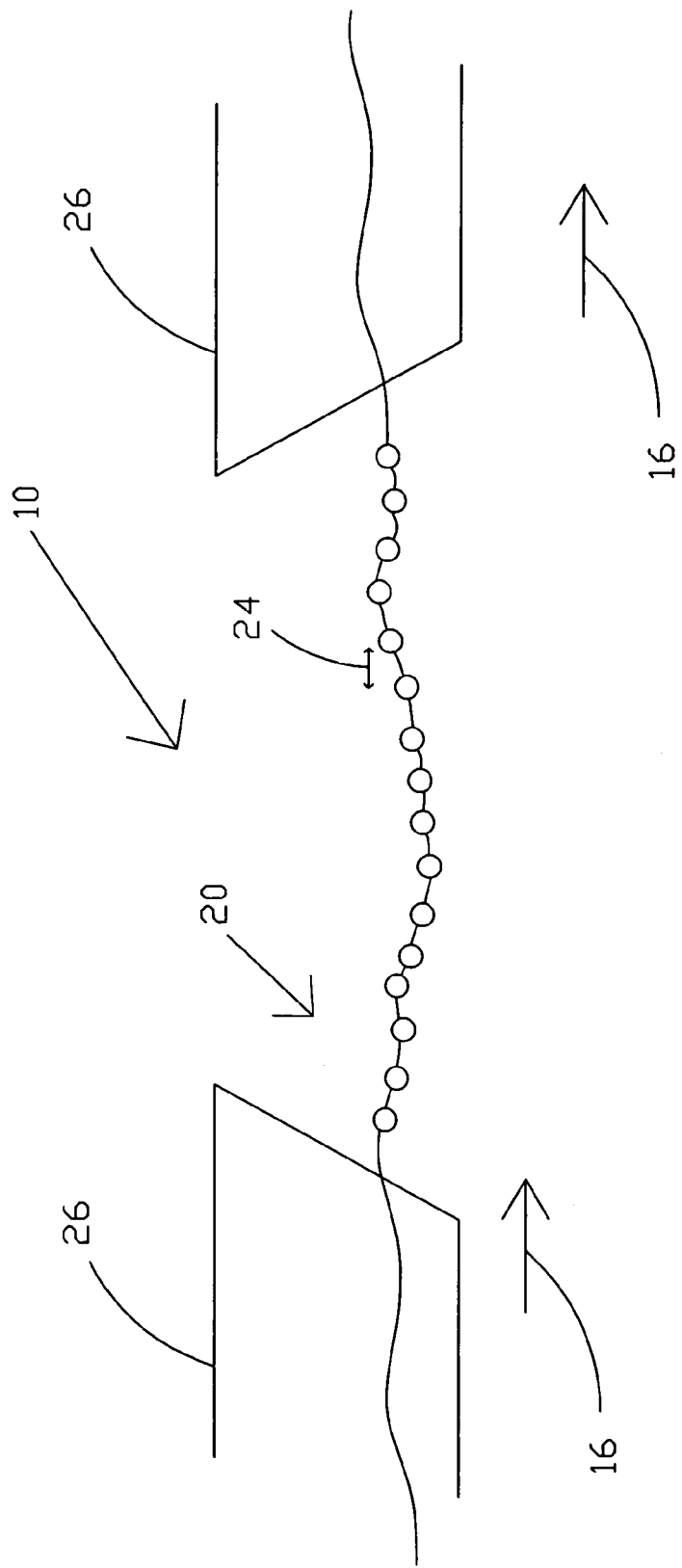
FIG. 3 is a schematic view of one possible embodiment of the present invention which may be utilized for establishing a covert RF signal propagation path to one or more surface ships.

In another embodiment, as shown in FIG. 3, a covert RF signal propagation path could be formed. For instance, surface ships may stream the plurality of MEMS RF chips 14 overboard or release them underwater to form an RF signal path to one or more subsequent surface ships 26 or underwater vehicles 12 or 22 to utilize an advantage of the present invention whereby, because RF signals attenuate rapidly in water, the propagation path would also be covert.

In another possible embodiment of the invention, the MEMS RF chips 14 may be mounted on an inexpensive string or line (not shown) so as to be easily reeled out and so that the spacing between the MEMS RF chips 14 may be controlled for longer periods of time. After use, the entire reel could be discarded.

Many additional changes in the details, components, steps, algorithms, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for creating an underwater RF signal propagation path, comprising:
   releasing a stream of individual RF transceivers from an underwater vehicle at a predetermined rate to effect a spacing between said individual RF transceivers that is less than the distance for which the underwater RF signal would be attenuated to below noise levels; and
   propagating an RF signal underwater by transmitting said RF signal to a first of said RF transceivers which in turn retransmits said RF signal so that said RF signal is transmitted along said stream of individual RF transceivers.

2. The method of claim 1, further comprising providing that said individual RF transceivers have a predetermined buoyancy.

3. The method of claim 2, wherein said predetermined buoyancy is selected so that at least a portion of said individual transceivers reach a water surface to effect an RF signal propagation path from said underwater vehicle to, air.

4. The method of claim 2, wherein said predetermined buoyancy is selected to be neutral or approximately neutral.

5. The method of claim 4, further comprising utilizing said stream of individual RF transceivers to provide an RF signal propagation path between said underwater vehicle and another underwater vehicle.

6. The method of claim 5 wherein said step of propagation further comprises the steps of:
   receiving said underwater RF signal;
   amplifying said RF signal; and
   re-transmitting said amplified RF signal to an adjacent RF transceiver along said RF signal propagation path.

7. The method of claim 1, further comprising utilizing MEMS RF chips as said individual RF transceivers.

8. The method of claim 1, further comprising discarding said stream of individual RF transceivers after use.

9. A system for creating an underwater RF signal propagation path, comprising:
   a plurality of individual RF transceivers releasable into water, said plurality of individual RF transceivers having a predetermined buoyancy, said plurality of individual RF transceivers each having an RF transmission/reception range and being operable for transmitting and receiving with respect to each other, whereby when said plurality of individual RF transceivers are released into water, said underwater RF signal propagation path is formed and;
   at least one underwater vehicle operable for releasing a stream of said individual RF transceivers at a controlled rate of release.

10. The system of claim 9, wherein said predetermined buoyancy is neutral or approximately neutral.

11. The system of claim 10, further comprising a first and second underwater vehicle whereby said underwater RF signal path is created there between.

12. The system of claim 9, wherein said predetermined buoyancy permits at least a portion of said individual RF transceivers to float to a surface to thereby provide a connection from said underwater RF signal propagation path to RF signal propagation path in air.

13. The system of claim 9, wherein said individual RF transceivers comprise MEMS RF chips.

14. The system of claim 9, wherein the operating life of each said individual RF transceiver is on the order of a few minutes in order to minimize power requirements.

15. A system for creating a covert surface water RF signal propagation path between a plurality of surface ships, comprising:
   a plurality of individual RF transceivers releasable into water by at least one of said surface ships, said plurality of individual RF transceivers having a predetermined buoyancy, wherein said predetermined buoyancy permits said individual RF transceivers to float on the surface of the water, said plurality of individual RF transceivers each having an RF transmission/reception range and being operable for transmitting and receiving with respect to each other, whereby when said plurality of individual RF transceivers are released into water, said covert surface water RF signal propagation path is formed, wherein at least one surface ship is operable for releasing a stream of said plurality of individual RF transceivers at a controlled rate of release whereby said controlled rate of release allows said individual RF transceivers to disperse on the water surface at a proximate distance that is less than or equal to said transmission/reception range, thereby establishing said covert surface water RF signal propagation path between said plurality of surface ships.

16. The system of claim 15, wherein said individual RF transceivers comprise MEMS RF chips.

17. The system of claim 16, wherein the operating life of each said individual MEMS RF chip transceiver is on the order of a few minutes in order to minimize power requirements and increase the covert nature of the RF signal propagation path.

* * * * *